United States Patent Office 3,214,311
Patented Oct. 26, 1965

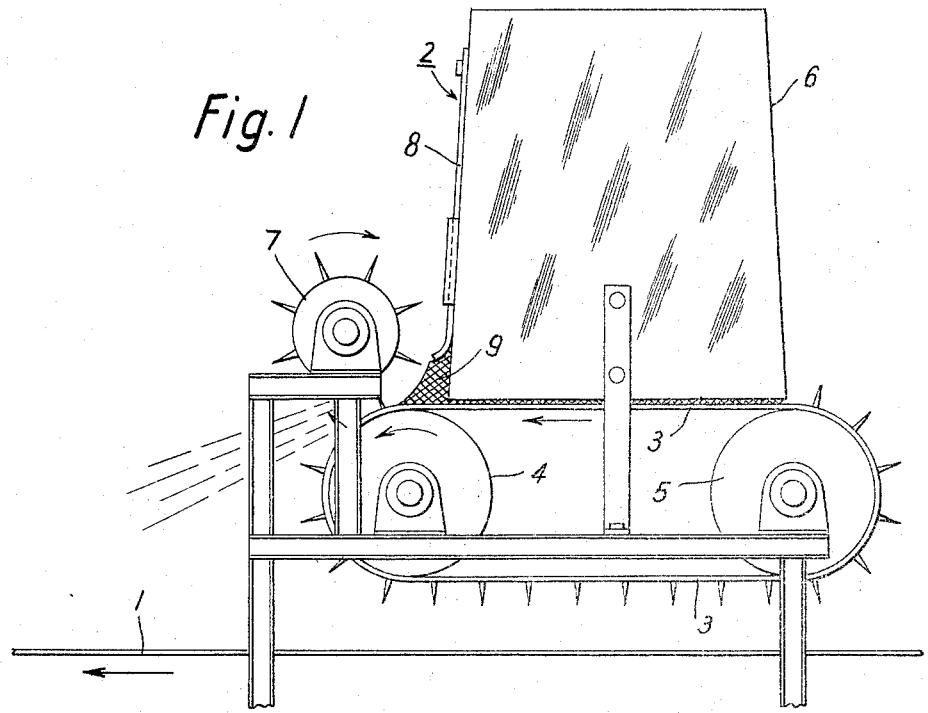
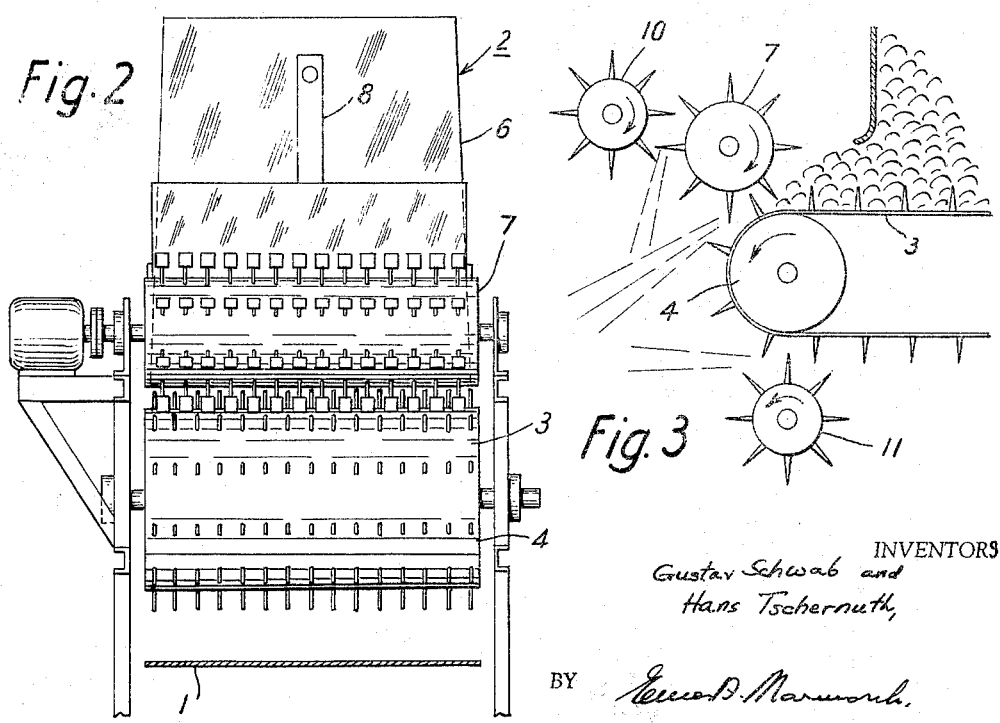

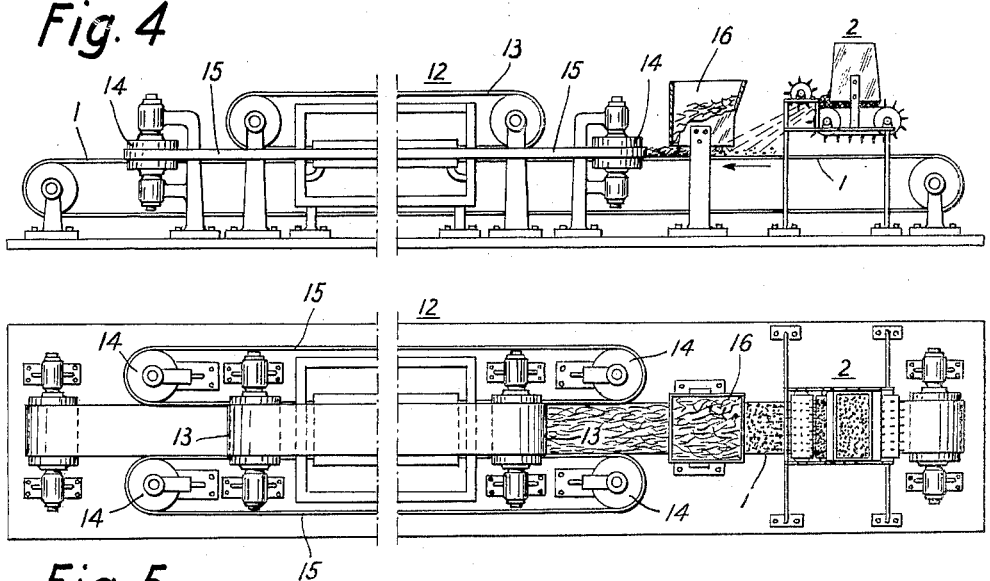
Fig. 4
Fig. 5
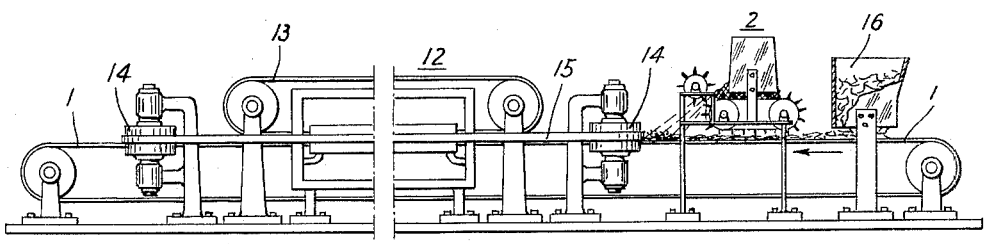
Fig. 6
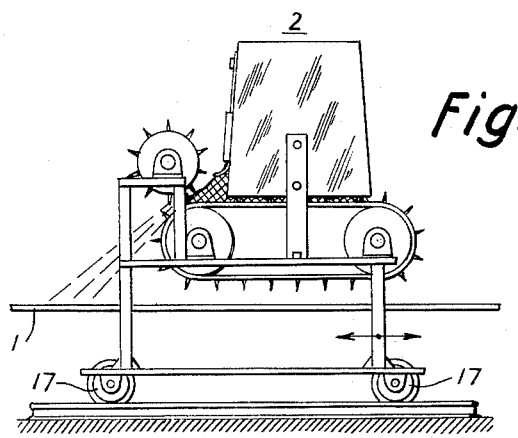
Fig. 7
INVENTORS:
Gustav Schwab and
Hans Tschernuth,
BY
THEIR ATTORNEY.

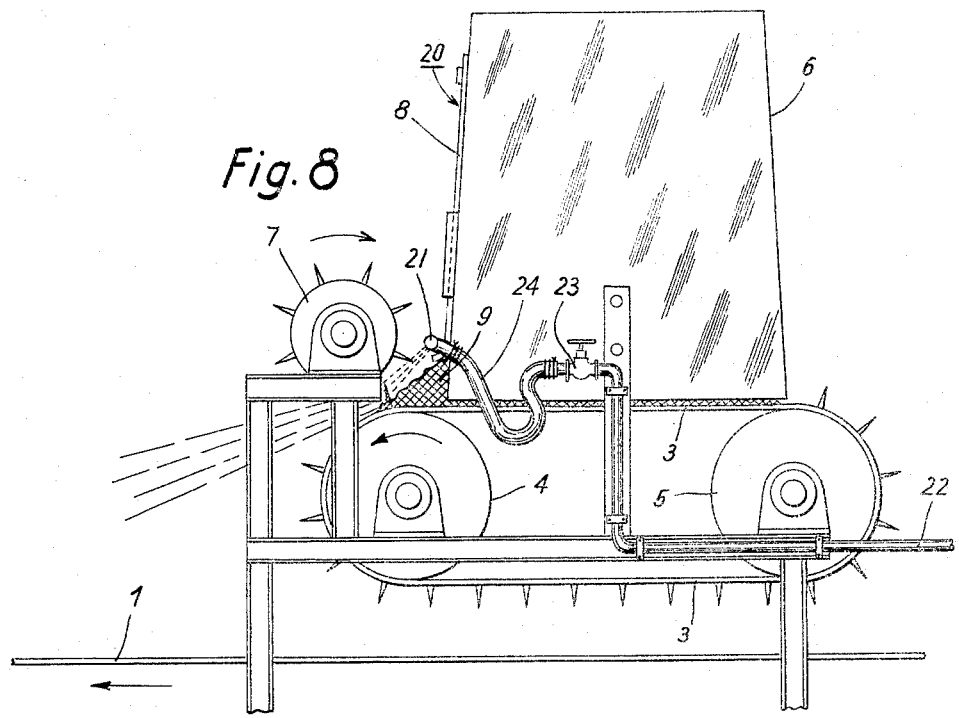
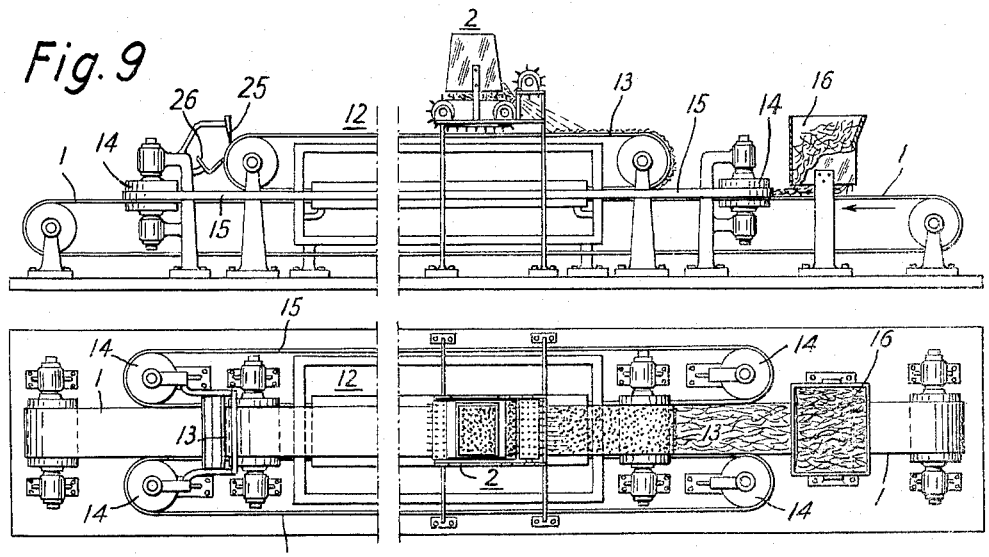

3,214,311
PROCESS FOR MANUFACTURING LIGHTWEIGHT
BUILDING SLABS
Gustav Schwab, Villach, Carinthia, and Hans Tschernuth, Ferndorf, Carinthia, Austria, assignors to Osterreichisch-Amerikanische Magnesit Aktiengesellschaft, Radenthein, Carinthia, Austria
Filed Feb. 17, 1961, Ser. No. 89,951
Claims priority, application Austria, Feb. 22, 1960,
A 1,369/60
10 Claims. (Cl. 156—62.8)

With the increasing use of heat insulating slabs in the interior of buildings it has proved desirable to provide these slabs with covering layers, which may serve either as plaster layers or as intermediate layers to which wall paper, plastic sheeting, floor finish etc. can be applied. These highly desirable covering layers were previously manufactured in a separate operation, which complicated the manufacture and impaired the economic efficiency of building operations. The subsequent application of the covering layer, e.g., with a spatula, is never entirely uniform and requires an after-treatment of the slabs, e.g., by grinding. Besides, the application of a covering layer to a lightweight wood-wool building slab will always give rise to stresses, which will result in cracks and deformation because the materials of the slab and of the covering layer, e.g., fresh floor finish, have appreciably different shrinkage and expansion values.

It is an object of the invention to provide a process which permits of the manufacture of such covered lightweight wood-wool building slabs in a continuous operation during the manufacture of the slabs themselves and to provide also an apparatus which is suitable for carrying out such a process.

It has been found that lightweight wood-wool building slabs or similar lagging slabs consisting of fiber materials bonded with mineral binders can be provided with covering layers in that before and/or after the application of the slab-forming material, consisting of wood-wool and binder, on the conveyor belt of a forming machine serving for the manufacture of lightweight wood-wool building slabs, the material forming the covering layer, which may be of fibrous or mortarlike nature, is applied in the form of a layer to the loose layer of wood-wool and/or the conveyor belt and together with the loose, bulky layer of the slab-forming material applied before and/or thereafter is fed to the forming machine and is shaped therein to form a layer which is immediately ready for use.

Compared to the previously necessary subsequent application of layers on lightweight building slabs the process according to the invention affords a number of important advantages. The application of one or several covering layers in a single operation eliminates the need for any treatment of the finished slab and the use of additional equipment. Since the covering layer is pressed and passed through the forming machine together with the slab composition, this layer will be perfectly planar. The joint pressing results in an excellent anchorage of the covering layer. Covering layers applied in this way are highly resistant and substantially increase the strength of the slab. For instance, a sawdust floor finish 7–12 mm. high applied according to the invention to a wood-wool slab 5 cm. thick resulted in an increase of the ultimate load up to 114%, i.e. more than the value which corresponds to the thickness of the covering layer. The compressibility of the slab is also greatly reduced because pressure acting on a point or line will be distributed over a larger surface area owing to the strength of the covering layer. This will result in an extremely large increase in bending strength, the covering layer resisting the compressive stress occurring in bending at the upper side of the slab whereas the tensile stress occurring on the underside may be taken up, e.g., by fabric coverings.

A slab manufactured according to the described process forms a self-contained unit together with the floor finish or the like covering material applied during the manufacture of the slab. As contrasted with the slabs having a subsequently applied covering this unit remains free of internal stresses. The covering layers obtained according to the invention form at the same time a pore sealer resulting in a great improvement of the insulating value, which will otherwise be lower because the heat transmission is increased by the circulation of air through the pores. Slabs having such covering layers are particularly suitable as a load-carrying roof slab which has on its top side a thin finish, to which the roof covering, such as roofing felt, may then be adhesively connected. If the underside is also smooth owing to the provision of a covering layer it is easy to apply a vapor barrier. Slabs with such covering layers providing a pore sealer are also highly suitable as a base for the adhesive connection of parquetry, wall paper, etc.

If the material which forms the covering is adapted to be strewed, it may suitably be strewed in finely divided form to constitute a loose layer, using a dispensing or strewing device which will be described hereinafter. This will result in the formation of a layer of the covering material of substantially uniform thickness on the highly fibrillated surface of the slab-forming material. During the shaping operation this layer can be shaped without difficulty to form a homogeneous outer layer.

Alternatively the material for a top covering layer may be applied, e.g., by strewing, to the upper conveyor belt of the revolving belts which define the forming channel of a forming machine before this upper conveyor belt is reversed into the direction of movement of the loose wood-wool layer, the material for the upper covering layer being applied to the slab-forming material during this reversal and after the slab-forming material has been applied to the lower conveyor belt of the forming machine.

This will ensure a uniform distribution of the material for an upper covering layer throughout the width of the web to be formed and a good bond between the covering layer and the underlying wood-wool layer. Alternatively, a second upper layer may be applied in this way and be bonded to a first upper layer previously strewed on the wood-wool. It is also possible, of course, to use this process for manufacturing a lightweight building slab which has a covering layer only on the upper side by applying the slab-forming material directly to the lower conveyor belt, without a lower covering layer, and to apply the covering material only with the aid of the upper conveyor belt.

The covering material may consist of any material which is suitable to form mortarlike compositions, finishes, coatings or strengthenings, and may be used with additional reinforcements, if desired. Materials which are preferred for the purposes of the invention include inorganic and/or organic fibers such as mineral fibers, asbestos, glass wool and slag wool, wood-wool, wood shavings, sawdust, chaff, textile fibers, as well as sand and the like fillers, e.g., for floor finishes. Any desired binder may be used, such as lime mortar, magnesia cement, Portland cement or plaster of Paris, although a synthetic resin binder or a bituminous binder, particularly in the form of a solution, emulsion or dispersion is also suitable. The reinforcements may consists of woven fabrics, braids, networks or fiber webs, synthetic resin materials, textile materials and fiber materials embedded in the layers.

A covering material which is particularly suitable for the manufacture of a floor or the like slab which may be used for many purposes consists of a woodfiber mortar which is composed of sawdust or wood-wool particles, caustic magnesia and magnesium sulfate solution and can be satisfactorily bonded even as a layer of small thickness to the layer of the slab-forming material. In the belt-type forming machine the two layers are then jointly pressed to the form of the wood-wool slab so that, e.g., the sawdust mortar forms a thin, but dense and smooth finish on one side of the slab. The belt-type forming machine will thus discharge a finished lightweight building slab, which distinguishes from the normal wood-wool and magnesia slab known under the trademark Heraklith by a greatly reduced compressibility and a higher ultimate bending strength. By applying a wire or plastic net on the wood-wool layer before it is strewed with the sawdust mortar, the floor finish can be reinforced to further increase the ultimate bending strength of the finished slabs.

A preferred embodiment of the process according to the invention relates to a simplified, cost-saving manufacture of laminated slabs having acoustic properties similar to those of the slabs known under the trademark Herakustik. It is known that particularly high-grade, expensive wood-wool having highly regular fibers must be used to these slabs. According to the invention this can be simplified and reduced in cost in that the body of the wood-wool slab is made from ordinary fibers and a covering layer of special fibers is applied to one or both sides. Relatively fine and short organic or inorganic fibers of regular form, which are covered with mortar, may be used for this purpose. If the wood-wool layer is strewed with light-colored shavings about 10 cm. long and covered with magnesia cement before being pressed in the belt-type forming machine, the regular surface structure required for Herakustik slabs can be obtained with a small amount of fibers. It is sufficient if only a thin surface layer of the slab consists of the light-colored, fine, regular and selected fibers covered with mortar.

In many cases it is desirable if the materials intended to form a mortarlike or floor-finishlike covering layer are mixed in a dry condition and the liquid which is required to obtain the mortarlike consistency and the binding power respectively, and which may contain additional admixtures is added to the dry mixture immediately before it is stremed. In this way the mortar or the like is prevented from forming large agglomerates which cannot be broken up during the application and result in defects in the covering layers. Besides, the material which forms the covering layer is conveyed in this case by the applying device in a dry condition, which is much simpler than the conveyance of the material after it has been pasted.

In a preferred embodiment of the last-mentioned variant of the process according to the invention a mortar-like covering layer may be formed from a dry mixture of sawdust, caustic magnesia and kieserite or the like, on which the necessary amount of water is sprayed immediately befor the mixture is strewed. Alternatively the water-soluble component required to form magnesia cement, such as magnesium sulfate or magnesium chloride, is dissolved in the amount of water to be sprayed and is supplied in this form by spraying to a dry mixture consisting of sawdust and caustic magnesia. The sprayed liquid may also contain other substances in addition or alone, which need not consists of mortar components or the like. This refers particularly to water-repellent admixtures such as bitumen emulsions.

According to a further variant of the process, the joint forming of the slab-forming material and the covering layers may be combined with a profiling step. This can be effected, e.g., in a manner known per se by using an appropriately shaped backing consisting, e.g., of the conveyor belt entering the forming machine.

To carry out the process described hereinbefore, the invention provides special arrangements which constitute additional equipment to supplement the previously usual processing plants in a simple, easily controlled manner. To this end a belt-type forming machine is used which is conventional in the continuous manufacture of lightweight wood-wool building slabs and in which a continuous forming channel is defined by endless belts extending around reversing rollers. In the channel wood-wool and mineral binders are formed into a web and compacted. This machine is provided with dispersing means for the covering material close to the feed end of the machine.

The design of these apparatus and the various applications thereof will be described more in detail hereinafter with reference to the accompanying drawings, in which FIG. 1 is an elevation showing the applicator in the form of a strewing device.

FIG. 2 is and end view of FIG. 1.

FIG. 3 shows a modified form of the strewing device.

FIGS. 4 and 5 are an elevation and top plan view, respectively, showing an entire plant with the belt-type forming machine and the strewing device over the lower conveyor belt.

FIG. 6 shows an inverted arrangement of the strewing device and the feeding of the slab-forming material.

FIG. 7 shows a wheeled strewing device.

FIG. 8 shows a device for strewing covering layers, in which device the water required for pasting the mortar or the like is sprayed shortly before the strewing station.

FIGS. 9 and 10 are a top plan view and an elevation, respectively, showing a belt-type forming machine for lightweight wood-wool building slabs, in which machine the material to form the covering layer is applied to the returning run of the upper conveyor belt.

The strewing device 2 shown in FIGS. 1 and 2 and disposed above the endless conveyor belt 1 of the belt-type forming machine on the feed side thereof comprises a conveyor belt 3, which is set with spikes, teeth or the like driving projections arranged in several longitudinal rows and which extends around two drums 4 and 5, one of which is driven to cause the spiked belt to revolve. A feed hopper 6 for the material to be strewed is disposed over the spiked belt. A rectangular outlet opening 9 for the material to be strewed is formed in the boundary wall of this hopper next to a strewing roll 7 provided above the head end of the spiked belt and is adjustable by a shutter 8. When the spiked belt is moved in the direction indicated by an arrow in FIG. 1 it will carry out of the hopper a layer 6 of the covering material, such as a mortar composition or wool-wool having no mortar applied thereto or provided with a magnesia cement composition. The thickness of this layer can be controlled by the vertically adjustable shutter.

The strewing roll 7 is adjustable relative to the drum 4 for varying the direction of strewing. Just as the spiked belt 3 the strewing roller 7 has spikes, teeth or blades which are arranged in several axially extending rows and in the cases of the smallest spacing between the drum and the strewing roller are disposed between the spikes etc. of the spiked conveyor and extend as closely as possible to the spiked conveyor without contacting the same. The spiked conveyor carries suitably in all cases spikes or teeth whereas the strewing rollers need to be provided with spikes or the like only when bulky material such as wool, shavings, fibers and the like are to be processed. Where mortarlike compositions are to be supplied it is preferable to use blades as is indicated in the left-hand part of FIG. 2.

When the hopper has been filled with the composition to be strewed, the spiked belt 3 moved in the direction of the arrow carries a certain amount of the covering material along. The rotating strewing roller (rotating at 300–1200 revolutions per minute) strews the composition supplied to it in a finely divided condition to the steel belt 1 of the belt-type forming machine, or to the loose layer of the slab-forming composition which has already been applied to this steel belt, which is continuously moved under the roller. Owing to the high speed of the strewing roller each of its rows of spikes will remove only a thin layer of the mortar or wood-wool composition moved relatively slowly to the strewing roller. By this operation, lumps of mortar or compressed bunches of the wood-wool shavings will be loosened up and strewed in a finely divided condition. The height of the strewed layer can be very exactly adjusted by controlling the height of the opening 9 in the container 6 by means of the shutter 8 and, above all, by means of the velocity of the feed movement of the spiked belt 3. The height of the spikes, teeth or the like of the spiked belt 15 and the strewing roller and the spacing of these driving projections must be determined in view of the nature of the material to be strewed.

For instance, when a sawdust mortar is to be strewed, it is sufficient to use spikes 2–3 cm. high, whereas spikes 6–8 cm. high are required for strewing wood-wool shavings 10 cm. long and having no mortar or provided with mortar. As is indicated in FIG. 3 the strewing or inserting of wood-wool shavings 50 cm. long and provided with mortar or having no mortar on a continuously moving belt requires spikes mre than 10 cm. high. Two additional spiked rollers 10 and 11 in a staggered arrangement serve for cleaning the strewing roller 7 and the spiked belt 3 from shavings that have been caught and for strewing such shavings on the desired surface.

The strewing device described hereinbefore enables the application of a particularly uniform layer of any desired mortar or of shavings, fibers, etc., provided with mortar or having no mortar on a continuously moving belt or to evenly strew a certain area by a uniform feed movement of the spiked belt. The revolving spiked belt carries from a heap of mortar or shavings a more or less uniform layer and the strewing rollers strew the material supplied to them evenly on a certain surface. In the case of variations in the rate at which the shavings are removed from the hopper by means of the spiked belt, the operator of the strewing device may compensate any changes observed in the strewed layer by controlling the velocity of the feed movement of the spiked belt by means of a continuously variable transmission.

In the similar strewing device 20 shown in FIG. 8, the mortar is pasted shortly before it is strewed. In this case the feed hopper 6 is filled with the dry mixture of the material to be strewed. The adjustable shutter 8 has a spraying tube 21 secured to it at its lower edge, which determines the height of the layer of the emerging dry material. This spraying tube 21 sprays the liquid required for pasting, such as water, directly on the strewing area. The movement of the conveyor belt 3 will thus cause the dry mortar material to emerge from the feed hopper 6 in the height determined by the shutter 8 and the material will be moistened in that area where it is taken up by the strewing roller 7. The moistening being effected shortly before strewing, the material cannot harden in the form of lumps. The liquid is supplied by a conduit 22 which is secured to the frame of the strewing device and which communicates through a shut-off cock 23 and a hose 24 with the spraying tube 21. The remote control may be arranged to effect an automatic interruption of the supply of liquid in the case of any fault in the plant.

In the plant shown in a general view in FIGS. 4 and 5, the belt-type slab-forming machine 12 comprises the lower endless steel belt 1 and the upper endless steel belt 13. 14 are the rollers for the narrow lateral tapes 15 for confining the edges of the slabs. In FIG. 4 the strewing device 2 (or 20) is arranged over the lower conveyor belt before the feed hopper 16 for the slab composition so that the covering layer is formed under the slab.

FIG. 6 shows the operation of forming a covering layer on the upper side of the slab. In this case the strewing device 2 (or 20) is arranged over the lower conveyor belt and behind the feed hopper 16 of the slab material, considered in the direction of movement of the steel belt 1. The strewing device need not be fixed in position but may be movable on wheels 17, as is apparent from FIG. 7 or may be displaceable by other means along the conveyor belt 1. It is also possible to arrange an appropriate number of spraying devices over the lower steel belt to form several covering layers.

FIGS. 9 and 10 show a similar plant, with which slabs having a covering layer only on the upper side can be made by applying the material to the upper conveyor belt. Only the feed hopper 16 for the slab composition consisting of wood-wool and binders is arranged over the lower endless steel belt 1. By means of the feed hopper 16, a layer of wood-wool is applied to the lower belt 1 and this belt carrying this layer moves toward the forming channel defined by four endless conveyor belts. A strewing device 2 (FIGS. 1, 2) for the covering layer is disposed over the upper conveyor belt 13 and applies the material to the returning run of this conveyor belt. The material for the covering layer may also be applied, if desired, with the aid of the strewing device 20 (FIG. 8) described hereinbefore, in which the dry material is pasted only immediately before the strewing station. The upper conveyor belt 13 provided with a uniform layer of covering material will then move around the reversing roller and contact the wood-wool layer fed by the lower belt 1. In this way the covering material is pressed and bonded to the loose wood-wool layer at the point where the wood-wool layer is fed into the nip formed by the lower belt and the reversing roller. When emerging at the end of the forming channel the covering layer remains bonded to the wood-wool so that the upper belt travels back without covering layer. Any particles of the covering material adhering to the returning belt are suitably separated from the belt by a cleaner 25 disposed at the reversing roller on the outlet end and are collected in a collecting trough 26.

What is claimed is:

1. In a process of manufacturing wood wool slab material having a covering layer at least on one side, the steps comprising, continuously preforming an uncompressed layer of finer material, continuously preforming a loose layer of coarser wood wool, applying the preformed uncompressed finer layer from above to the coarser wood wool layer at a point before the coarser layer has been compressed, and subsequently compressing both layers together, said finer layer forming the covering layer.

2. In a process, as claimed in claim 1, and moving said layers in opposite directions during the preforming.

3. In a process, as claimed in claim 1, and applying a binder between said layers for bonding them together.

4. In a process, as claimed in claim 1, and applying an additional finer layer to the other side of said wood wool layer before the layers have been compressed, and subequently compressing said layers together.

5. In a process, as claimed in claim 1, wherein said finer layer is formed as a wet mixture by supplying a liquid to a dry mixture of the components of said finer layer.

6. In a process, as claimed in claim 5, said dry mixture comprising saw dust, caustic magnesia and magnesium salt, said liquid being water.

7. In a process, as claimed in claim 1, the steps in preforming said finer layer comprising applying prior to the uniting with the coarser layer a mortar like composition of fibers and a binder material selected from the group consisting of lime mortar, magnesia cement, Portland cement, plaster of Paris, synthetic resin and bituminous binding agents.

8. In a process, as claimed in claim 7, said mortar like composition comprising a mixture of saw dust, wood shavings, caustic magnesia and magnesium sulphate solution, and applying a reinforcement between said covering layer and said base layer.

9. In a process, as claimed in claim 7, said fibers comprising wood shavings of a length of about 10 centimeters.

10. In a process, as claimed in claim 7, said mortar like composition comprising a dry mixture of saw dust, caustic magnesia and kieserite on which an amount of water necessary for mortar like consistency is sprayed immediately before the mixture is applied.

References Cited by the Examiner

UNITED STATES PATENTS

| | | | |
|---|---|---|---|
| 1,031,190 | 7/12 | Liebau | 154—1 |
| 1,967,291 | 7/34 | Crandell et al. | 154—1 |
| 2,012,805 | 8/35 | Brown et al. | 154—1 |
| 2,028,616 | 1/36 | Loetscher | 154—1 |
| 2,288,072 | 6/42 | Collins | 156—28 |
| 2,737,997 | 3/56 | Himmelheber et al. | 154—1 |
| 2,743,758 | 5/56 | Uschmann | 154—01 |
| 2,744,045 | 5/56 | Collins | 154—1 |
| 2,766,553 | 10/56 | Wedge | 154—1 |
| 2,890,147 | 6/59 | Pearson et al. | 156—34 |
| 2,909,804 | 10/59 | Means | 154—1 |
| 2,944,291 | 7/60 | Prior | 154—1 |
| 2,979,105 | 4/61 | Burkner | 154—1 |

FOREIGN PATENTS 325,550   12/57   Switzerland.

EARL M. BERGERT, *Primary Examiner.*

CARL F. KRAFFT, *Examiner.*